United States Patent
Doerr et al.

(10) Patent No.: US 7,174,063 B2
(45) Date of Patent: Feb. 6, 2007

(54) COLORLESS TUNABLE DISPERSION COMPENSATOR EMPLOYING A PLANAR LIGHTWAVE CIRCUIT AND A DEFORMABLE MIRROR

(75) Inventors: Christopher Richard Doerr, Middletown, NJ (US); Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 42 days.

(21) Appl. No.: 11/073,009

(22) Filed: Mar. 4, 2005

(65) Prior Publication Data

US 2006/0198577 A1    Sep. 7, 2006

(51) Int. Cl.
G02B 6/12    (2006.01)
G02B 6/26    (2006.01)

(52) U.S. Cl. .......................................... 385/14; 385/27

(58) Field of Classification Search ............... None
See application file for complete search history.

(56) References Cited

U.S. PATENT DOCUMENTS

2003/0021046 A1    1/2003    Cao et al.
2004/0151432 A1*   8/2004    Tabuchi et al. ............... 385/37
2005/0063076 A1*   3/2005    Shimazu et al. ............ 359/846

FOREIGN PATENT DOCUMENTS

EP    1 445631 A    8/2004
WO    WO 02/101442 A    12/2002

OTHER PUBLICATIONS

H. Ooi et al. 40-Gb/s WDM transmission with virtually imaged phased array (VIPA) variable dispersion compensators. Journal of Lightwave Technology, vol. 20 No. 12, pp. 2196-2203, Dec. 2002.*
D. Marom et al. Compact colorless tunable dispersion compensator with 1000-ps/nm tuning range for 40-Gb/s data rates. Journal of Lightwave Technology, vol. 24 No. 1, pp. 237-241, Jan. 2006.*

* cited by examiner

Primary Examiner—Rodney Bovernick
Assistant Examiner—Mike Stahl

(57) ABSTRACT

A colorless, waveguide-grating-router-based tunable dispersion compensator includes a planar lightwave circuit and a deformable mirror, optically coupled to each other by a plano-cylindrical glass lens such that a fast tuning speed and single-knob dispersion adjustment are obtained. In a further aspect of the present invention, the waveguide-grating router is pinched, symmetrical about its center line, and has a half-wave plate inserted therein to provide polarization independence. In a still further aspect of the present invention, the deformable mirror includes, reflective film attached to opposing piezo-electric actuators.

18 Claims, 3 Drawing Sheets

COLORLESS TUNABLE DISPERSION COMPENSATOR EMPLOYING A PLANAR LIGHTWAVE CIRCUIT AND A DEFORMABLE MIRROR

FIELD OF THE INVENTION

The present invention generally relates to optical systems for communication, and more particularly relates to a colorless tunable dispersion compensator suitable for use in high data-rate optical communication systems using wavelength division multiplexing.

BACKGROUND

A number of advances in electronics manufacturing technologies and digital system architectures have resulted in a vast number of business and consumer devices which are capable of generating and communicating information between and amongst each other, consequently increasing the demand for information communication services. Such an increase in the demand for information communication services leads to a corresponding increase in demand for transmission capacities.

One means of providing increased transmission capacity is to provide additional communication network infrastructure. However there is a substantial cost associated with building out additional communication network infrastructure.

Another approach to satisfying the demand for increased information communication capacity is to increase the data rates used in transmitting information across a network. In optical networks, the intersymbol interference due to chromatic dispersion increases quadratically with bit rate. Chromatic dispersion refers to an effect in which the rate at which an optical signal propagates through an optical fiber varies depending on the transmitted wavelength.

At a desired data transmission rate of 40 Gb/sec, the required tighter tolerances, and time-varying changes in dispersion, should be dealt with by compensating for the dispersion.

An optical tunable dispersion compensator (TDC) has utility for long-reach links such as those used in 40-Gb/s systems. Electronic dispersion compensation at 40 Gb/s is not presently suitable for practical use, and yet fiber temperature changes in long links are enough to require the use of a TDC. Importantly, a TDC needs to be colorless, which means that the TDC should have a free-spectral range (FSR) equal to the channel spacing, thereby enabling reconfigurable wavelength-division multiplexing (WDM) networks, and reducing inventory and administrative issues. Another desirable attribute for a TDC for use in, for example, a 40 Gb/s system, is to have a fast tuning speed (e.g., less than about 1 ms) in order to make robust and time-efficient dispersion-control feedback loops. Additionally, single-knob adjustment of the dispersion is desirable, in order to minimize control complexity.

What is needed is a compact, low-power, colorless, tunable dispersion compensator having a fast tuning speed and single-knob dispersion adjustment.

SUMMARY OF THE INVENTION

Briefly, a colorless, waveguide-grating-router-based tunable dispersion compensator includes a planar lightwave circuit and a deformable mirror, optically coupled to each other by a plano-cylindrical glass lens such that a fast tuning speed and single-knob dispersion adjustment are obtained.

In a further aspect of the present invention, the waveguide-grating router is pinched (i.e., waveguides are brought close together) in the center, symmetrical about its center line, and has a half-wave plate inserted therein to provide polarization independence.

In a still further aspect of the present invention, the deformable mirror is a buckling reflective film.

BRIEF DESCRIPTION OF THE DRAWINGS

FIG. 3: buckled)

DETAILED DESCRIPTION

Figure 1:
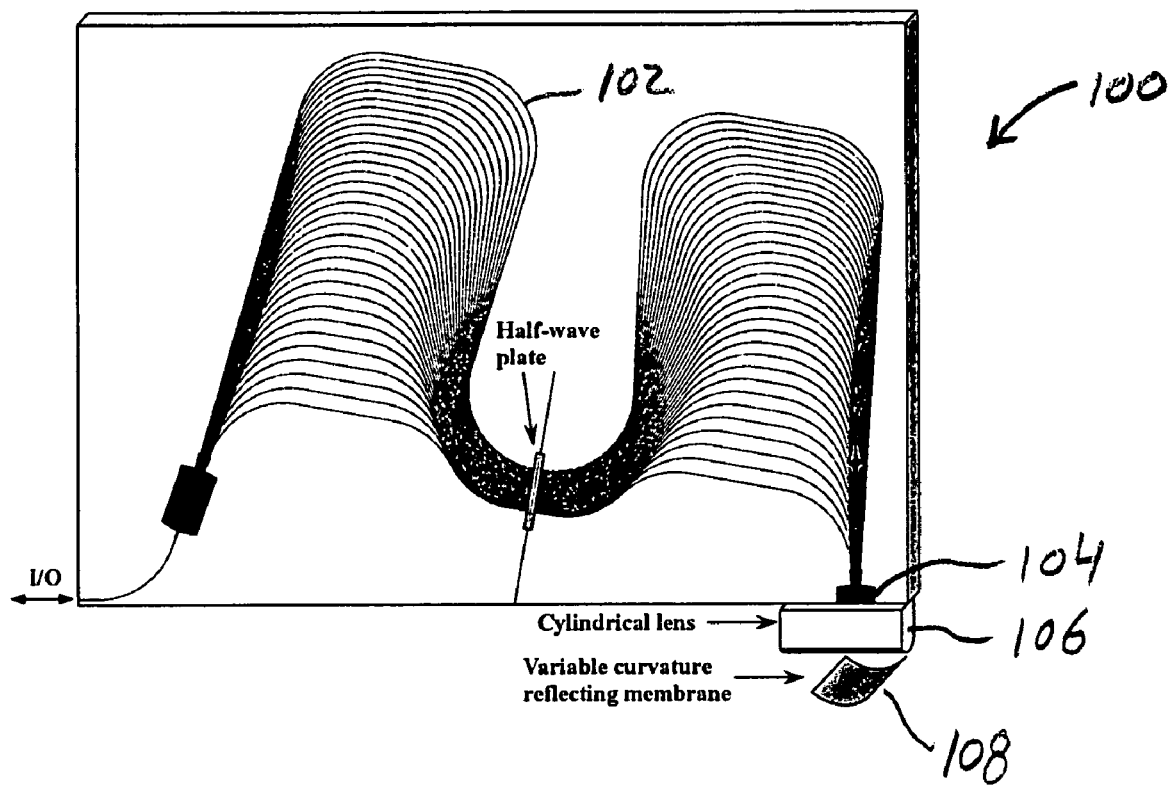
FIG. 1 shows an illustrative waveguide layout of the tunable dispersion compensator including a cylindrical lens and a membrane.

Generally, a waveguide-grating router (WGR)-based tunable dispersion compensator in accordance with the present invention is colorless, has fast single-knob tuning, is bandwidth efficient, can provide a very large tuning range, and is compact. A WGR-based TDC in accordance with the invention uses a deformable mirror rather than a thermo-optic lens, thereby significantly reducing power consumption and size. The high resolution and polarization independence result from "pinching" of the symmetrical WGR in its center as can be seen in FIG. 1. In some embodiments a half-wave plate is inserted in the symmetrical WGR (also illustrated in FIG. 1).

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Various aspects of the illustrative embodiments of the present invention are described with specific numerical values representing parameters such as, for example, length or radius. Where these values are described herein as being "nominal", it is meant that the specified value is intended but that it is recognized that slight variations due to actual manufacturing tolerances are to be expected. The nominal values presented comprehend and include the ranges inherent in the manufacturing processes used to prepare and provide the various components of the illustrative embodiments.

Various prior art approaches to colorless tunable dispersion compensation devices include bulk-optic, ring-resonator, waveguide-grating router, and Mach-Zehnder interferometer devices. However, none of these approaches, or devices, provides the advantageous combination of compact size, low power consumption, high spectral resolution, large tuning range, fast tuning, single-knob adjustment, and polarization independence without using polarization diversity, as is found in embodiments of the present invention.

Various embodiments of the present invention provide a WGR-based TDC that is colorless, has fast single-knob tuning, is bandwidth efficient, can provide a very large tuning range, and is compact. An exemplary WGR-based TDC, in accordance with the present invention, uses a deformable mirror, thereby saving significant power consumption as compared to prior art approaches that used a thermo-optic lens. Although a non-tunable dispersion compensator using a WGR and a fixed mirror was previously reported, a WGR-based TDC in accordance with the present invention has an extremely high spectral resolution, and a very large tuning range for a 40-Gb/s 100-GHz-FSR TDC. The high resolution and polarization independence are enabled by "pinching" of the WGR in its center.

An illustrative waveguide layout, and the concept of the colorless tunable dispersion compensator are shown in FIG. 1. The planar lightwave circuit (PLC) 100 consists of buried 0.80%-index-contrast waveguides on a silicon substrate. The waveguides have an effective birefringence of ~60 pm at 1550 nm. The WGR is pinched in the middle for several reasons. First, pinching provides a significant savings in the amount of wafer area consumed by the waveguide-grating router. Second, pinching significantly reduces the sensitivity to refractive index gradients in the wafer. Third, pinching enables the insertion of a small half-wave plate to make the TDC polarization-independent.

Still referring to FIG. 1, the WGR of this illustrative embodiment has 34 grating arms 102, and the free-spectral range is 100 GHz. It is noted that the WGR is symmetric about its center line. A star coupler is disposed at each end of the WGR. The radius of each star coupler is nominally 3 mm, and the grating-arm pitch at the star couplers is nominally 11.5 μm. The star coupler design is chosen such that only one sign of curvature is required to tune the full dispersion range.

In the illustrative embodiment shown in FIG. 1, the chip, in which the waveguide-grating router is disposed, is cut at the second star coupler 104 output curve, where a plano-cylindrical glass lens 106 with 1 mm radius was glued, or otherwise adhesively attached with index matched adhesive. Such a lens may be a plano-convex cylindrical lens. It will be appreciated that any suitable means of attachment may be used.

A mirror 108, in this illustrative embodiment, is formed from a commercial grade, 2-mil thick, aluminum-coated Mylar film that is glued, or otherwise adhesively attached, to opposing piezo-electric actuators. Various embodiments of the invention may use actuators that are electrostatically actuated. Although this illustrative embodiment adhesively attaches the deformable mirror to the actuators, any suitable means of mechanically attaching the deformable mirror to the actuators may be used. It will be further appreciated that any suitable flexible reflective membrane may be used in place of the aluminum-coated Mylar film described in connection with this illustrative embodiment.

Figure 2:
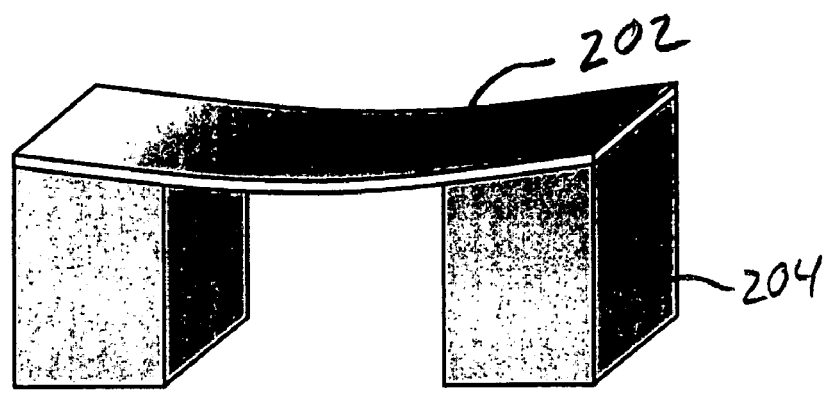
FIGS. 2 and 3 show the variable curvature obtained by buckling a Mylar film having a reflective coating, by means of piezo-electric actuators (FIG. 2: unactuated.
Figure 3:
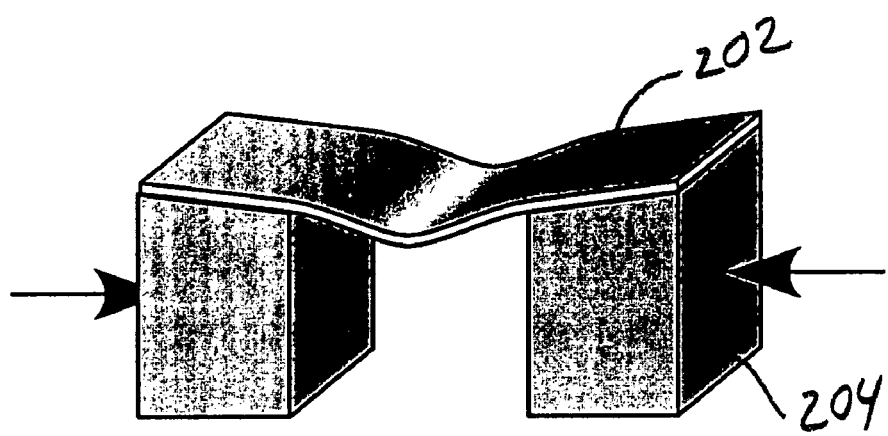
Figure 4:
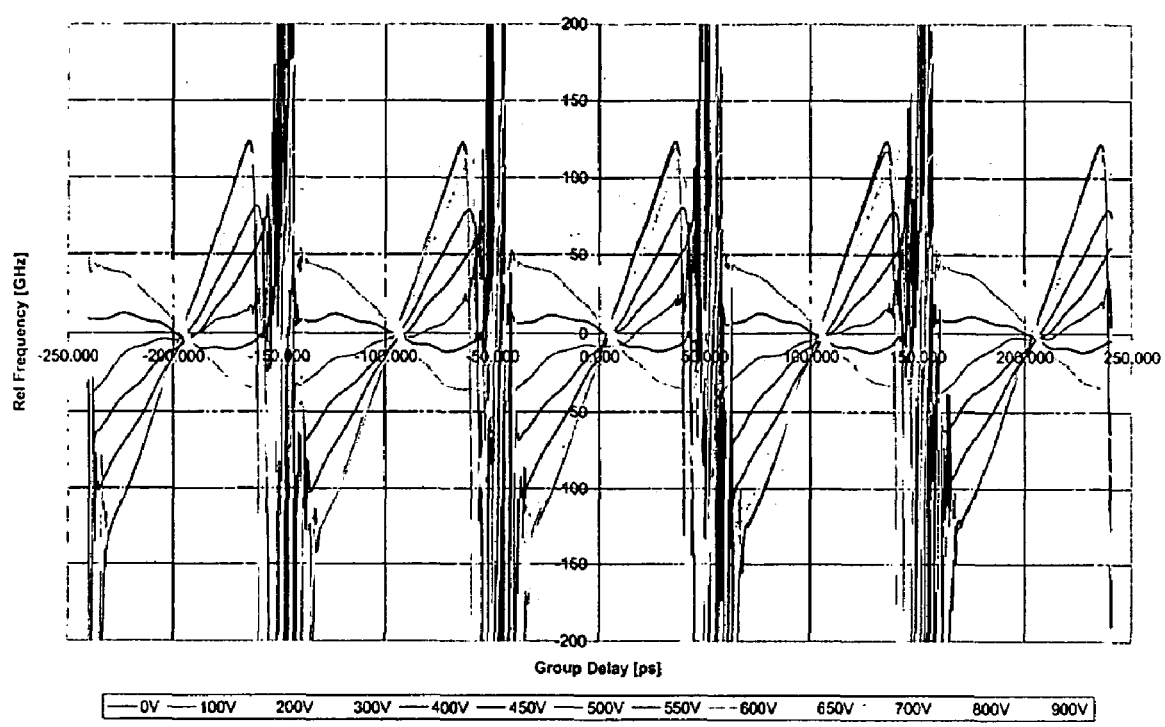
FIG. 4 illustrates the group delay of a TDC in accordance with the present invention, showing dispersion values in the range of −475 to x.

In this illustrative embodiment, a variable curvature reflective membrane 202 is formed from an aluminum-coated flexible film, such as a Mylar film. The variable curvature reflective membrane 202, or deformable mirror, achieves a variable radius of curvature by buckling, as shown in FIGS. 2–3. Using a buckling mirror to tune the dispersion compensator is possible in this embodiment of the present invention because only one sign of curvature needed to cover the desired dispersion range. If the star coupler 104 radius is $R_0$, and the mirror 108 radius is R, then the dispersion is $$D = \frac{2n\lambda_0}{c_0}\left(\frac{R-R_0}{RR_0}\right)\left(\frac{dx}{d\lambda}\right)^2 \quad (1)$$

where n is the refractive index of glass, $\lambda_0$ is the free-space wavelength, $c_0$ is the free-space speed of light and $dx/d\lambda$ is the spatial dispersion, $$\frac{dx}{d\lambda} = \frac{c_0 R_0}{na\Delta f \lambda_0} \quad (2)$$

a is the grating-arm pitch at the star coupler, and $\Delta f$ is the WGR free-spectral range.

Some results achieved with the illustrative embodiment of the present invention described above include: Group Delay Ripple (GDR) <~10 ps.; Insertion Loss (IL) from 10 to 13 dB, depending on setting; Polarization Dependent Loss (PDL) is less than 1 dB for low dispersion values; rises at high dispersion values to 2–4 dB; and Differential Group Delay (DGD) <5 ps except at high dispersion values.

It is noted that many alternative arrangements of a colorless, WGR-based TDC in accordance with the present invention may be provided. By way of example, and not limitation, the lens may be attached to the second star coupler by any suitable means, rather than by adhesive attachment. Similarly, a flexible reflective membrane that comprises the deformable mirror may be attached to its corresponding actuators by any suitable mechanical means of attachment, rather than by adhesive attachment. Additionally, the substrate upon which the WGR is formed may be any suitable substrate, rather than a silicon substrate.

CONCLUSION

A colorless tunable dispersion compensator employing a planar lightwave circuit and a deformable mirror has been described herein. Various embodiments of the present invention have a tuning, or adjustment, range of nominally 1000 ps/nm and have a free-spectral range of nominally 100 GHz. Various embodiments of the present invention are suitable for use in communication systems have data rates of 40 Gb/s.

Some advantages of waveguide grating router based tunable dispersion compensators with deformable mirrors, in accordance with the present invention, are relatively low power consumption, fast single-knob tuning, bandwidth efficiency, very large tuning range, and physical compactness.

It is to be understood that the present invention is not limited to the embodiments described above, but encompasses any and all embodiments within the scope of the subjoined Claims and their equivalents.

We claim:
1. A tunable dispersion compensator, comprising:
  a planar lightwave circuit including a waveguide grating router with one star coupler terminated in a facet, wherein the waveguide grating router is pinched in the center;
  a cylindrical lens attached to the facet; and
  a deformable mirror configured to reflect back into the planar lightwave circuit.
2. The tunable dispersion compensator of claim 1, wherein the star coupler that is terminated in the facet is configured such that only one sign of curvature of the deformable mirror is required to tune a full dispersion range.

3. The tunable dispersion compensator of claim 2, wherein the deformation of the mirror is achieved by buckling the mirror.

4. The tunable dispersion compensator of claim 1, further comprising a half-wave plate inserted in the waveguide grating router so as to make the waveguide-grating router polarization-independent.

5. The tunable dispersion compensator of claim 1, wherein the waveguide grating router has a free-spectral range of 100 GHz.

6. The tunable dispersion compensator of claim 3, where the buckling of the mirror is achieved via piezo-electric actuators.

7. The tunable dispersion compensator of claim 3, the buckling of the mirror is achieved via actuators that are electrostatically actuated.

8. The tunable dispersion compensator of claim 7, wherein the deformable mirror comprises an aluminum-coated flexible film.

9. A colorless tunable chromatic dispersion compensator, comprising:
   a planar lightwave circuit comprising a waveguide-grating router pinched in the middle and symmetric about its center line;
   a first star coupler disposed at a first end of the waveguide-grating router, and a second star coupler disposed at a second end of the waveguide-grating router,
   a lens disposed adjacent the second star coupler;
   a deformable mirror disposed adjacent the lens; and
   at least a first and a second actuator, the first and second actuators mechanically coupled to the deformable mirror.

10. The colorless tunable chromatic dispersion compensator of claim 9, wherein the actuators comprise piezo-electric actuators.

11. The colorless tunable chromatic dispersion compensator of claim 9, wherein the planar lightwave circuit comprises a silicon substrate.

12. The colorless tunable chromatic dispersion compensator of claim 10, wherein the waveguides are 0.8% index-contrast buried waveguides.

13. The colorless tunable chromatic dispersion compensator of claim 9, wherein waveguides have an effective birefringence of approximately 60 pm at 1550 nm.

14. The colorless tunable chromatic dispersion compensator of claim 9, wherein the radius of the star couplers is nominally 3 mm and the grating arm pitch at the star couplers is nominally 11.5 μm.

15. The colorless tunable chromatic dispersion compensator of claim 9, wherein the second star coupler is configured such that only one sign of curvature is required to tune a full dispersion range.

16. The colorless tunable chromatic dispersion compensator of claim 9, wherein the lens is a piano-cylindrical glass lens.

17. An optical communication system, comprising:
   at least one receiver at a communications network node, the at least one receiver including a colorless tunable dispersion compensator;
   wherein the colorless tunable dispersion compensator comprises:
   a planar lightwave circuit including a waveguide grating router with one star coupler terminated in a facet, wherein the waveguide grating router is pinched in the center;
   a cylindrical lens attached to the facet; and
   a deformable mirror configured to reflect back into the planar lightwave circuit.

18. The optical communication system of claim 17, wherein the star coupler that is terminated in the facet is configured such that only one sign of curvature of the deformable mirror is required to tune a full dispersion range.

* * * * *